United States Patent [19]

Nakajima et al.

[11] Patent Number: 5,649,081
[45] Date of Patent: Jul. 15, 1997

[54] METHOD AND APPARATUS FOR PATTERN DATA PROCESSING

[75] Inventors: Norihiro Nakajima; Hiroshi Arai; Ichiro Harashima; Yoshiaki Shinotsuka, all of Hitachi; Tomotoshi Ishida; Motomi Odamura, both of Katsuta; Shigeru Arai, Yokohama; Takeo Yamada, Tokyo, all of Japan

[73] Assignee: Hitachi, Ltd., Tokyo, Japan

[21] Appl. No.: 384,466

[22] Filed: Feb. 2, 1995

Related U.S. Application Data

[63] Continuation of Ser. No. 943,027, Sep. 10, 1992, abandoned.

[30] Foreign Application Priority Data

Sep. 10, 1991 [JP] Japan .................... 3-230423

[51] Int. Cl.⁶ .................................... G06T 17/50
[52] U.S. Cl. .................... 395/130; 395/125; 395/127
[58] Field of Search .................... 395/120, 125, 395/129, 130, 141, 142, 127

[56] References Cited

U.S. PATENT DOCUMENTS 4,845,651  7/1989  Aizawa et al. ................ 395/125
5,255,352  10/1993 Falk ................................. 395/125

*Primary Examiner*—Almis R. Jankus
*Assistant Examiner*—Cliff N. Vo
*Attorney, Agent, or Firm*—Antonelli, Terry, Stout & Kraus, LLP

[57] ABSTRACT

A method and device for pattern processing whereby accurate and effective processing can be carried out as a user desires. A pattern processing device of this invention comprises an information input/output device, an information processing device, and a data storage device; wherein the information processing device comprises pattern processing means, significance describing means, characteristic information input means, characteristic information extraction means, characteristic information describing means, and pattern processing means making reference to characteristic information. Intentions of a user or characteristics of pattern elements or sets of pattern elements are described and added to the pattern data so that this characteristic information can be referred to when pattern data processing is carried out. Thus, it is possible to make accurate representation of pattern data in a computer, and it is also possible to generate or convert patterns as the user desires.

20 Claims, 8 Drawing Sheets

{501:(X1,Y1,Z1)}
{502:(X2,Y2,Z2)
    A(dXa,dYa,dZa),
    B(dXb,dYb,dZb),
    C(dXc,dYc,dZc)}
{503:(X3,Y3,Z3)}

{601:Line(501,502)
    TV(l1,m1,n1),
    NV(l2,m2,n2),}
{602:Line(502,503)
    TV(l3,m3,n3),
    NV(l4,m4,n4),}

{501:(X1',Y1',Z1')}
{502:[504/505/506]
    (X2,Y2,Z2),
    A(dXa,dYa,dZa),
    B(dXb,dYb,dZb),
    C(dXc,dYc,dZc)}
{503:(X3',Y3',Z3')}
{504:(X4,Y4,Z4)
    A(dXa,dYa,dZa),
    B(dXb,dYb,dZb),
    C(dXc,dYc,dZc)}
{505:(X5,Y5,Z5)
    A(dXa,dYa,dZa),
    B(dXb,dYb,dZb),
    C(dXc,dYc,dZc)}
{506:(X6,Y6,Z6)
    A(dXa,dYa,dZa),
    B(dXb,dYb,dZb),
    C(dXc,dYc,dZc)}

{601:Line(501,505)
    TV(l1,m1,n1),
    NV(l2,m2,n2),}
{602:Line(504,503)
    TV(l3,m3,n3),
    NV(l4,m4,n4),}
{603:Curve(505,506,504)
    B(dXb,dYb,dZb)}

{501:(X1,Y1,Z1)}
{502:(X2,Y2,Z2)}
{503:(X3,Y3,Z3)}

{601:Line(501,502)}
{602:Line(502,503)}

{501:(X1',Y1',Z1')}
{502:(X2',Y2',Z2')}
{503:(X3',Y3',Z3')}
{504:(X4',Y4',Z4')}

{601:Line(501,502)}
{602:Line(502,503)}

METHOD AND APPARATUS FOR PATTERN DATA PROCESSING

This application is a continuation of Ser. No. 07/943,027, filed Sep. 10, 1992, now abandoned.

BACKGROUND OF THE INVENTION

1. Field of the Invention

The present invention relates to a method and apparatus for pattern data processing which allows a computer to create, modify, and synthesize a pattern. More specifically, this invention relates to a method and apparatus for pattern processing which is suitable for modifying patterns maintaining the original features and characteristics of the patterns.

2. Description of the Related Art

A technology for inputting pattern data into a computer and generating patterns in a computer is disclosed in the reference (A) of the following reference list. Approximate calculation methods for internal processing of patterns are described in the literatures (B) and (C). A method of making a principal description of pattern data in a computer and generating a geometric model of the pattern and displaying the patterns, is disclosed in the reference (D). The reference (F) describes a method of holding temporary data during pattern processing as a geometric constraint and a method of parametric modification of a pattern using geometric constraint relations, and furthermore a pattern correction method based on geometric inference. The reference (E) discloses a method of describing meanings of pattern data by attribute data and a method of performing automatic conversion of geometric models into another data description form, such as a finite-element model, using a means of interpreting the attribute data.

(A) Toshio Ochi, "Graphic Image Processing System GIPS—I", Mechanical Design, Vol. 16(7), pp. 29–37 (1972)

(B) Fujio Yamaguchi, "Pattern Processing Engineering—I, II, III", The Nikkan Kogyo Shinbun, LTD.

(C) Hiroaki Chiyokura, "Solid Modeling", Kogyo Chosakai Publishing Co., LTD.

(D) Japanese Patent Application No. 61-4933, "Method of Graphic Layout Display"

(E) Japanese Patent Application No. 1-318163, "Method and Apparatus for Automatic Division into Elements"

(F) Yasumasa Kawashima, "An Automatic Shape Modification Using Surface Constraint in CSG", Journal of the Japan Society for Precision Engineering, Vol. 56(4), pp. 703–708(1990)

In conventional technologies described in the above references, only pattern data or attribute data needed for interpretation based on the knowledge engineering are retained and used. Therefore, it is impossible to keep the input general characteristics during editing processing or modification processing of the pattern. This problem is described further below in detail.

When pattern processing is carried out using a computer, calculations required for the processing are, in general, achieved by the numerical calculations. As a result, the pattern processing suffers calculation errors of a computer, numerical calculation errors, and approximating representation errors. For example, when a length of a curve between two points is calculated approximating a curve by a line or an arc, there occurs an approximating representation error between these two approximation methods. Because a computer deals with limited digits of numbers, the calculation errors depend on the precision of the calculation or the number of significant digits effective in calculation. That is, even if a length of an arc is calculated using an equation which analytically represents a circle, calculation errors of a computer bring about an error in the calculated length compared to the real length. Furthermore, if a length of an arc is determined by approximate numerical calculation based on the trapezoidal rule or Simpson's rule, the error appears due to the difference in a method of calculation, in addition to the error due to the approximate numerical calculation. Accordingly, in a current method of pattern processing, the errors described above always cause a problem.

When a pattern is created, in addition to the errors described above, another important consideration is what a user intends for his/her pattern creation. For example, the pattern may be required to deal with information of a sense which cannot be represented adequate by mathematics or science. That is, the sense to be dealt with is such as "smoothness" or "swelling feature of a surface" of patterns, which are based on a subjective sense. These senses represent what is called geometric definitions of a pattern, however a means of geometric representation of a sense is not established yet, thus it is difficult to create a pattern as a user requires.

When errors described above are combined with a problem of the intended purpose of the creation, various problems occur. For example, in the case of the processing to determine a point at which two lines intersect, numerical calculation can determine the point of intersection, but the calculation might be incorrect. A more concrete example is when an intersection point is to be determined between two lines A and B which can be considered to exist on the same plane within a small error, and the resultant intersection point is one of the following three types. The first type is a point in a three-dimensional space which is simply determined by numerical calculation. The second and the third types are a point on either line A or line B which is infinitely near the first type intersection point in a three-dimensional space. Which intersection point among these three is correct should be decided from the view point of the intended purpose of the creation. If, moreover, the point is to be created with complicated purpose, there might be other various intersection points rather than just these three mentioned types. As a result, there exists a problem that it is impossible to create a pattern as a user requires.

In current pattern processing systems or CAD systems, these errors or intended purposes of creation are interpreted and processed in a certain predetermined way and the user's intentions in his/her creation are neglected. For example, as for the three type intersection points described above, one of these is unequivocally selected during the pattern processing by systems or apparatus. Accordingly, there exists a problem that the created pattern is different from what the user intends. In order to solve a part of this problem, the method of geometric constraint, which describes the geometric states that each portion of a pattern has to satisfy, was described in the prior art reference (F).

Although the technology of geometric constraint can describe simple geometric states, it cannot fully conduct certain kinds of processing because the problem set forth above is not taken into account in this technology. Even if it is assumed that there are no errors attributable to the above-mentioned problem, there are still some geometric states which this technology cannot properly describe. Furthermore, in some cases, even the geometric state itself cannot be described. For example, in the case that the intersection point has been determined between an arc and a line, when the arc is moved, the method of geometric constraint allows the line to automatically follow the movement of the arc, maintaining the connection state of the intersection point. However, when this is done in the processing of a movement together with an enlargement or reduction of the pattern, which is called offset, the description of the state of the intersection point is sufficient, that is, means for changing the state of an intersection point is not defined well enough to describe the geometric states each portion of a pattern has to satisfy after the processing. A concrete example is when a pattern is enlarged and moved, the position of an intersection point shifts and it becomes difficult to describe the connection state. When a pattern is reduced and moved, an intersection point disappears and it becomes impossible to describe the connection state.

For example, when a pattern consisting of two lines 601 and 602 which are connected to each other at a right angle at a point 502 (X2, Y2, Z2) is offset in the direction denoted by the arrows shown in FIG. 6, the processing of offsetting changes pattern data from those described on the left side in the figure to those described on the right side. The resultant pattern based on the data after the processing consists of two separated lines which no longer have an intersection point. In order to keep the connection state as a geometric constraint in these cases, another procedure is required, such as re-calculation of the intersection point or extension of pattern elements. However, in order to carry out these procedures correctly, an intersection point or pattern elements must be defined. If these definitions are described by a vague expression such as a character string called an attribute, problems arise in that geometric definitions of patterns become vague or lengthy and it becomes necessary to carry out various kinds of interpretations.

As an example of the problem, when the state of the intersection point between the arc and the line described above is the first one among three types, that is, a three-dimensional intersection point, the state which can describe the pattern characteristics of this point is not clearly defined. On the other hand, when the second type intersection point exists on a line, it is possible to describe the situation that the point exists on the line, but on the other hand, it is difficult to describe the characteristics of the arc. In the case of the third type intersection point existing on an arc, there is also a similar problem. That is, just a simple description of geometric state—an intersection point—cannot represent geometric definitions sufficiently.

As described above, in conventional technologies, it is impossible to perform the modification of linked patterns, and it is also impossible to perform correct creation or conversion of patterns in editing or creation procedures just as a user wants to do. As a result, it is necessary to carry out a huge amount of operations for making correction, such as re-generation of pattern data or modification. In order to solve these problems, in addition to a simple description of geometric states, the change in state has to also be described to achieve the description of real dynamic pattern states.

SUMMARY OF THE INVENTION

It is an object of the present invention to achieve an effective creation or conversion of patterns that a user wants to carry out in editing or modifying linked patterns, by automatically keeping general characteristics of patterns.

In order to achieve the object described above, the present invention adopts the following technical means and combines some of these means for processing elements or sets of elements of patterns.

(1) Significance description means;
(2) Characteristic information input means;
(3) Characteristic information extraction means;
(4) Characteristic information describing means; and
(5) A pattern processing means for referencing to characteristic information.

These five means are described in detail below.

Significance description means (1) has a function of giving processing priority to pattern elements and sets of pattern elements stored on a data storage device. Characteristic information input means (2) has a function of allowing a user to give any characteristic information to pattern elements and sets of pattern elements stored on a data storage device. Characteristic information extraction means (3) has a function of extracting at least one characteristic with respect to each pattern element and each set of pattern elements stored on a data storage device. Here, a characteristic may include geometric characteristics, topological characteristics, geometric state characteristics, differential geometry characteristics, optical characteristics, geographical characteristics, and empirical characteristics. Characteristic information describing means (4) stores all characteristic information obtained by characteristic information input means (2) or characteristic information extraction means (3), together with corresponding pattern data of pattern elements and sets of pattern elements stored on the data storage device. Pattern processing means making reference to characteristic information (5) creates or converts pattern data, referring to the characteristic information related to these pattern data and also considering the significance which is given as a priority data of the pattern processing, when various kinds of pattern processing are carried out to generate pattern models or geometric models, that is, when the pattern data of pattern elements and sets of pattern elements are taken out of the data storage device and processed.

Applicable combinations of these means are a combination of means (2), (4), and (5), a second combination of means (3), (4), and (5), and a third combination of means (2), (3), (4), and (5). Moreover, in addition to these combinations, means (1) can be added to any of these combinations.

First, by using the significance describing means, priorities of processing are given for pattern elements and sets of pattern elements stored on the data storage device, depending on the degree of the significance. Thus, the information is given which is to be referred to when it is necessary to give priority to some characteristics among characteristics of plural pattern elements and sets of pattern elements (pattern data). When the degree of significance is not defined, characteristic information is dealt with equally in the means which carries out the pattern processing referring to the characteristic information, or characteristic information is dealt with according to the rule defined by the means which carries out the pattern processing referring to the characteristic information.

Next, when a user adds any characteristic information to pattern elements and sets of pattern elements stored in the data storage device in an interactive way via characteristic information input means, such characteristic information is added, being related to the data already stored on the data storage device. Here, if no characteristic information is given by a user in an interactive way, the characteristic information extraction means automatically extracts the characteristics of the pattern and adds them to the pattern elements or the like. More specifically, the characteristic information extraction means extracts at least one characteristic for every pattern element and set of pattern elements stored in the data storage device. Here, a characteristic to be extracted may include geometric characteristics, topological characteristics, geometric state characteristics, differential geometry characteristics, optical characteristics, geographical characteristics, empirical characteristics and the like.

After the characteristic information is obtained, the characteristic information describing means stores in the data storage device all characteristic information obtained by the characteristic information input means and the characteristic information extraction means, together with the pattern data, being related to the pattern data of the pattern elements and sets of the pattern elements stored on the data storage device. This processing may be carried out sequentially or arbitrarily. When the pattern processing such as pattern creation and conversion is actually carried out, that is, when the pattern data of the pattern elements and sets of the pattern elements are taken out of the data storage device and are processed, the creation or conversion of the pattern is carried out by the pattern processing means making reference to characteristic information related to these pattern elements and sets of the pattern elements, further considering the degree of the significance which is given as the priority data of the processing. Here, if the degree of the significance is not defined, the processing is carried out neglecting the information of the degree of the significance. According to the described means and its procedure above, the wrong operations and undesirable operations are avoided, and the appropriate processing can be achieved.

DESCRIPTION OF THE PREFERRED EMBODIMENTS

Figure 1:
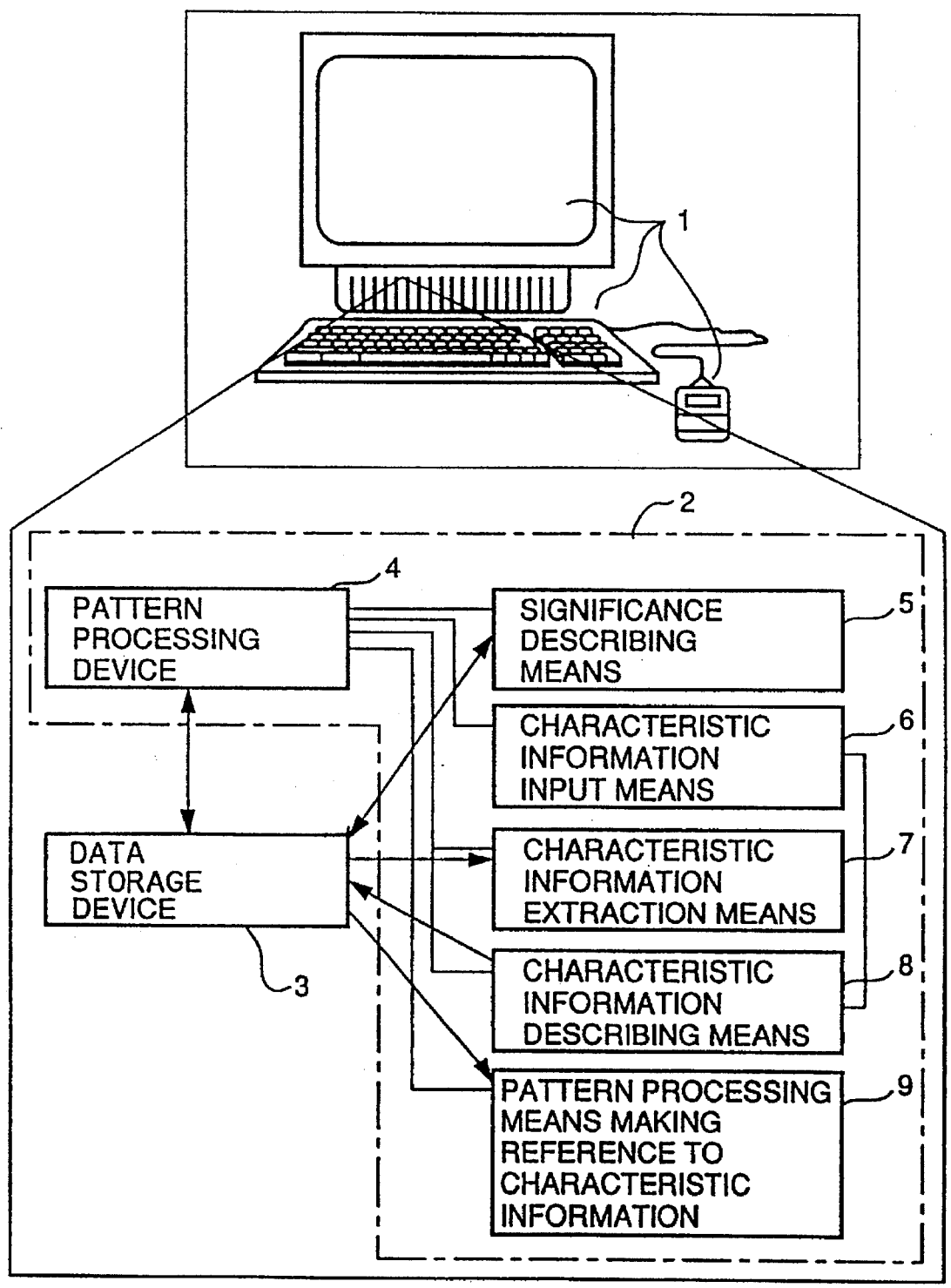
FIG. 1 is a block diagram showing the constitution of an embodiment of the present invention.

The following description describes a pattern data processing apparatus of a first embodiment of the present invention, as represented by FIG. 1. The apparatus includes an information input/output device 1, a data storage device 3, a pattern processing means 4, significance describing means 5, characteristic information input means 6, characteristic information extraction means 7, and pattern processing means making reference to characteristic information 9. A pattern processing method and its corresponding results are shown in FIG. 2, taking a calculation of an intersection point between an arc and a line as an example.

Significance description means 5 has a function of giving processing priority of processing to pattern elements and sets of pattern elements stored on a data storage device 3. Characteristic information input means 6 has a function of allowing a user to give any characteristic information to pattern elements and sets of pattern elements stored on a data storage device 3, having relation to data already stored on the data storage device 3. Characteristic information extraction means 7 has a function of extracting at least one characteristic with respect to each pattern element and each set of pattern elements stored on the data storage device 3. Here, a characteristic may include geometric characteristics, topological characteristics, geometric state characteristics, differential geometry characteristics, optical characteristics, geographical characteristics, and empirical characteristics. Characteristic information describing means 8 stores all characteristic information obtained by characteristic information input means 6 or by characteristic information extraction means 7, together with the pattern data of pattern elements and sets of pattern elements stored on the data storage device 3, having a relation to the pattern data already stored, on the data storage device 3. Pattern processing means making reference to characteristic information 9 creates or converts pattern data, referring to the characteristic information related to these pattern data and also considering the significance which is given as a priority data of the pattern processing, when various kinds of pattern processing are carried out to generate pattern models or geometric models, that is, when the pattern data of pattern elements and sets of pattern elements are taken out of the data storage device 3 and processed. Pattern processing means 4 controls the operation of each means 5 to 9 described above, the data storage device 3, and the information input/output device 1, and performs instructions input by an operator via the information input/output device such as a keyboard, a mouse, or a pointer. Each means 4 to 9 described above together comprise an information processing device 2. Furthermore, in the case of this embodiment, a CRT display is provided as a display means.

Figure 2:
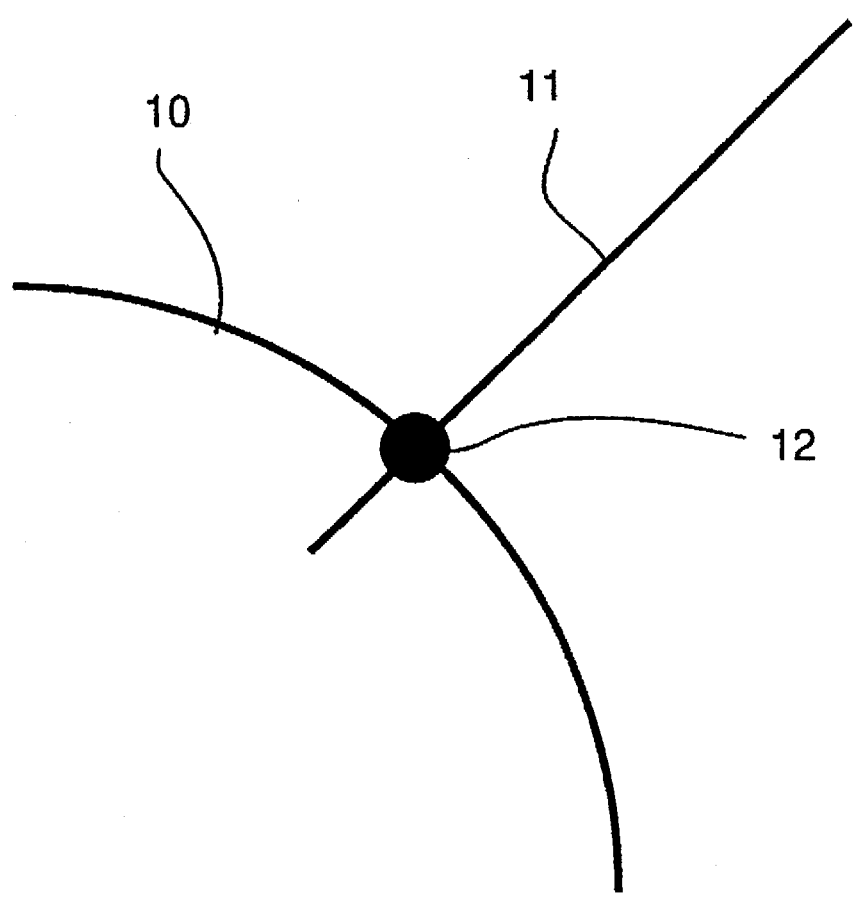
FIG. 2 is a plan view showing an example of a pattern to which the present invention is applied.
Figure 3:
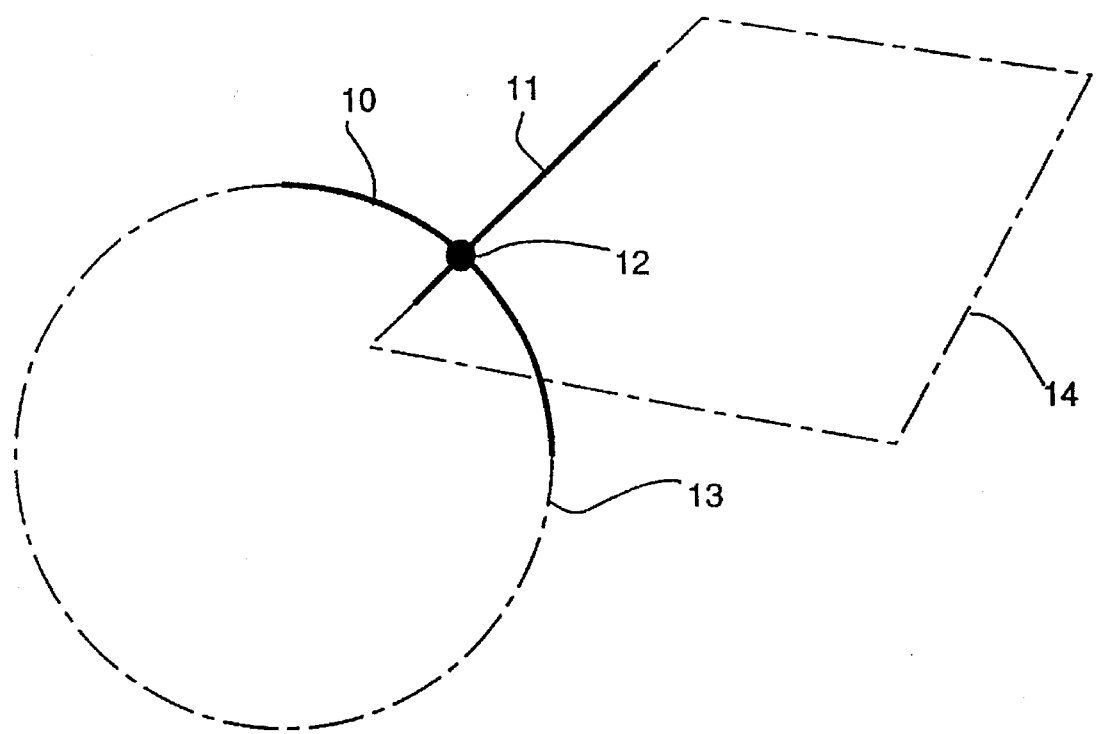
FIG. 3 is a schematic showing an example of pattern element data and data of a set of pattern elements which represent geometric attributes of the pattern shown in FIG. 2.

Referring to FIGS. 1 to 3, the flow of the processing of this embodiment is explained below. The intersection point between an arc 10 and a line 11 shown in FIG. 2 is denoted by point 12. Generally, a pattern data processing apparatus provides several commands for determining an intersection point 12, for example, one for determining a three-dimensional intersection point, one for determining an intersection point on a line, and so forth. Here, one example is given.

First, the pattern data of the arc 10 and the line 11 are created using the information input/output device 1 shown in FIG. 1, and are stored on the data storage device 3. Then, the degree of significance which shows processing priority is given to the arc 10 and the line 11 by interactive processing via the significance describing means 5. Here, it is assumed that higher significance is given to the arc 10 rather than to the line 11. For example, assume that significance degree of 100 is given to the arc 10 and significance degree of 50 is given to the line 11. In addition to the numerical number, the degree of the significance can be also given by means or information such as drawing with a bold line. Then, as an internal processing, the significance describing means 5 stores the information of the significance degree related to the pattern data of the arc 10 and the line 11, on the data storage device 3.

Then, an the operator interactively gives instructions via the pattern processing means 4 to determine the intersection point between the arc 10 and the line 11. According to the intersection calculation method of the given instructions, the pattern processing means 4 takes the pattern data and the significance degree data of the arc 10 and the line 11 out of the data storage device 3. Then, the characteristic extraction means 7 is called by the pattern processing means 4 to extract the characteristic information concerning the arc 10 and the line 11. Here, an operator can also input characteristic information if the characteristic information input means 6 is activated by the pattern processing means 4.

Figure 10:
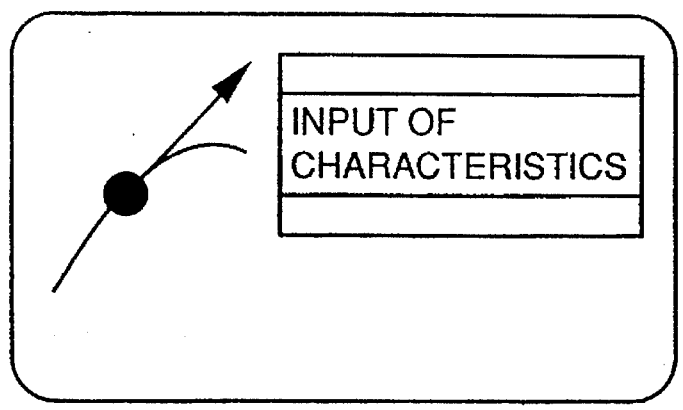
FIGS. 10, 11, and 12 are schematics showing examples of a screen displaying characteristic information input commands of an embodiment of the present invention.
Figure 11:
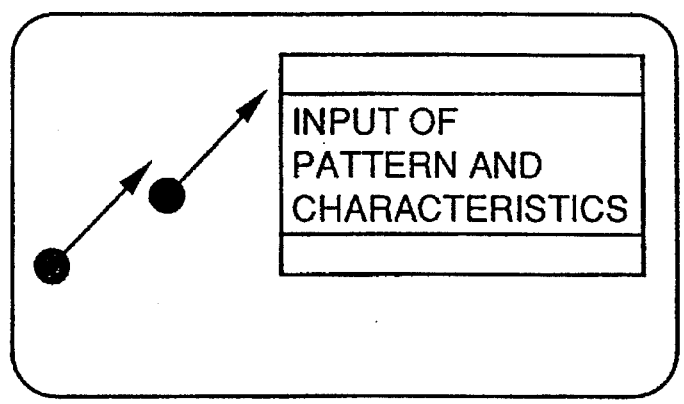
Figure 12:
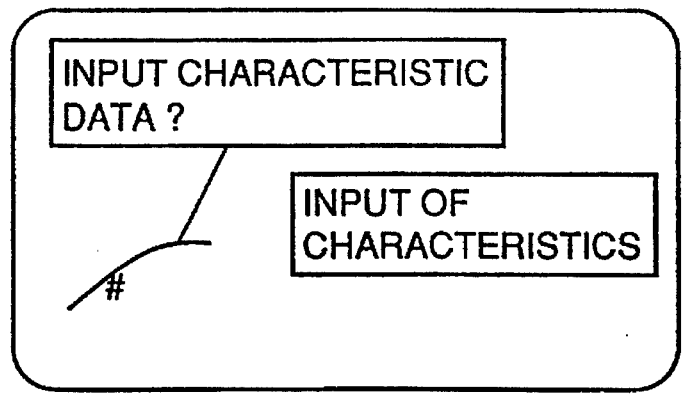

When the characteristic information input means 6 is activated, characteristic input commands are displayed on a screen of a CRT display as shown in FIG. 10. Thus, the operator selects a desired characteristic information command and inputs data to add the input characteristic information to the existing pattern data. If a command is provided for inputting both of pattern data and characteristic information at the same time as shown in FIG. 11, it is also possible to input characteristic information at the same time when new pattern data is input. For example, it is possible to simultaneously input coordinate data of a point as pattern data and a tangential vector and a curvature as characteristic information. It is also possible to provide a characteristic information input command following a data input, in such a way that whenever pattern data inputting is completed, the pattern processing means 4 activates the characteristic information input means 6 and causes it to display such a message shown in FIG. 12 on a display screen asking whether characteristic information input is needed. When the inputting of characteristic information is desired, characteristic information can be input after "INPUT OF CHARACTERISTICS" is pointed and selected with a cursor. In this way, it is possible to ask an operator to make sure that he/she input required characteristic information. It is also possible not to display a characteristic information input command following a data input, when the input pattern data already has characteristic information. Otherwise, even when characteristic information has already been given, it may be desirable to display a characteristic information input command following a data input, together with a message asking whether modification of characteristic information is desired, considering the case when some modification of characteristic information is needed. During the operation of inputting characteristic information, the information processing device 2 receives the characteristic information input via the characteristic information input command, and stores the characteristic information, such as a tangential vector or a curvature described above, on the data storage device 3, being related to the reference ID of selected pattern data.

There are various kinds of characteristic information, including geometric characteristics which define a line, curve, plane, and curved surface; topological characteristics which define whether a pattern is closed; geometric state characteristics which define a state such as a state of two contacting planes, differential geometry characteristics which define a tangential vector of a line, a normal vector, or vectors indicating the directions of enlargement/reduction of points; optical characteristics which define features of reflection or absorption of light at a surface; geographical characteristics which define information such as a contour line of a three-dimensional pattern; empirical characteristics which define feeling of touch at a surface, and so forth. Automatic extraction of differential geometry characteristics is taken as an example for explanation. First, a tangential vector and a curvature of the arc 10 are determined to be differential geometry information. Furthermore, the characteristic that the curvature is maintained to be constant is extracted at the same time.

As for the line 11, in a similar way, a tangential vector is extracted, and the fact that the tangential vector is maintained constant is also extracted as a characteristic. Moreover, if there are descriptions of geometric states of these line segments, those characteristics are also extracted at the same time. These characteristics include, for example as shown in FIG. 3, differential geometry characteristic amounts with respect to the data of the description of states. For example, the arc is a partial curve of a perfect circle 13, or the line is a partial boundary line of a plane 13, that is, the information of a tangential vector of the plane 14 or a curvature of the perfect circle 13. This characteristic information is stored on the data storage device 3 via the characteristic information describing means 8. Extracting and storage of these characteristic information can be carried out at any time in any processing procedure. For example, when the operator finishes inputting the data of these line segments, extraction and description of characteristic information can be carried out. Finally, as a pre-processing before performing the pattern processing making reference to characteristic information, the data of significance information is taken out of the data storage device 3 and the priorities in the calculation of the intersection point are set. Then, definition of the intersection point is determined by the pattern processing means 9 making reference to the characteristic information.

In order to determine the definition of the intersection point, the significance is referred to first. In this case, the significance of the arc is 100 and that of the line is 50, therefore the arc is regarded being more important and the means of calculating the intersection point which exists on the arc is selected among means available in the pattern processing means 4. Then, the pattern processing means 4 calculates the intersection point 12. The resultant intersection point 12 is to determine if it inherits the definitions of the arc 10 and line 11. The determined intersection point exists at least on the arc 10, more specifically, on the generating curve—perfect circle 13. However, it is not sure if the determined intersection point exists on the line for the reasons of numerical calculation errors described above as problems of conventional technologies. Therefore, referring to the tangential vector representing the characteristic of the line, and taking the characteristic data of the arc as a constraint condition, the position of the intersection point is moved to the most appropriate position on the arc. In this way, accurate position coordinates of intersection points can be determined. Furthermore, intersection point 12 describes the state of the connection between the arc 10 and the line 11, but the description using the position coordinate cannot represent the definition of the intersection point. Hence, the characteristic data of the arc 10 and the line 11 are given to the intersection point 12 to describe the definition of the geometric state wherein the point is a partial point of the perfect circle 13 or the plane 14, as well as the differential geometry characteristics for the expression of realistic definitions. Thus, even if these line segments are converted into free curves, their original pattern definitions are kept. As a result, it is possible to accurately create or convert patterns as an operator wants to do.

Figure 4:
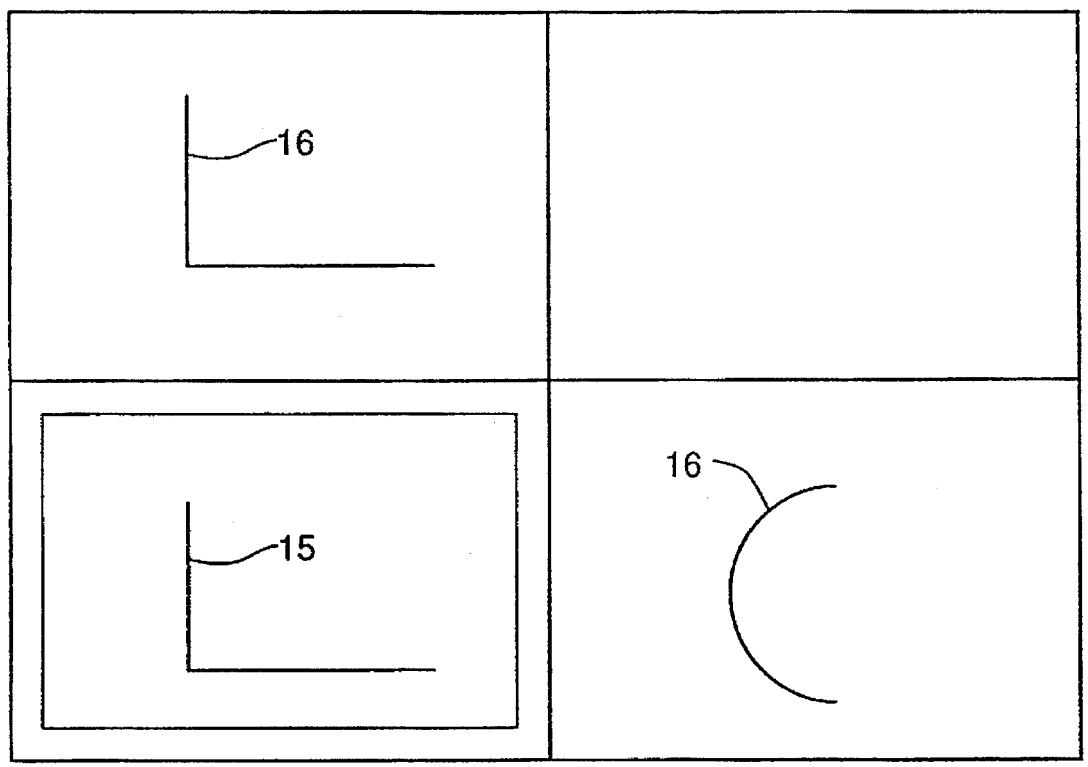
FIG. 4 is a schematic showing another example of a pattern to which the present invention is applied.

As a second embodiment, a method is described for easily creating three-dimensional patterns by giving characteristic information of the pattern, when three views are used and two-dimensional patterns are input on each view. Assume that two lines are input on a plan view as shown in FIG. 4. In this state, generally, it is impossible to know whether these line segments are an arc or a line. Here, these characteristics are given to make the meaning of the patterns clear. For example, if a curvature is given to the line segment 15 of the FIG. 4, then it is possible to easily define a free curve or an arc. Therefore, it becomes possible to represent a pattern 16 in the direction of a plan view or elevational view (pattern 16 seen from a certain direction among three views). Thus it is possible to easily create patterns or define the patterns.

Figure 5:
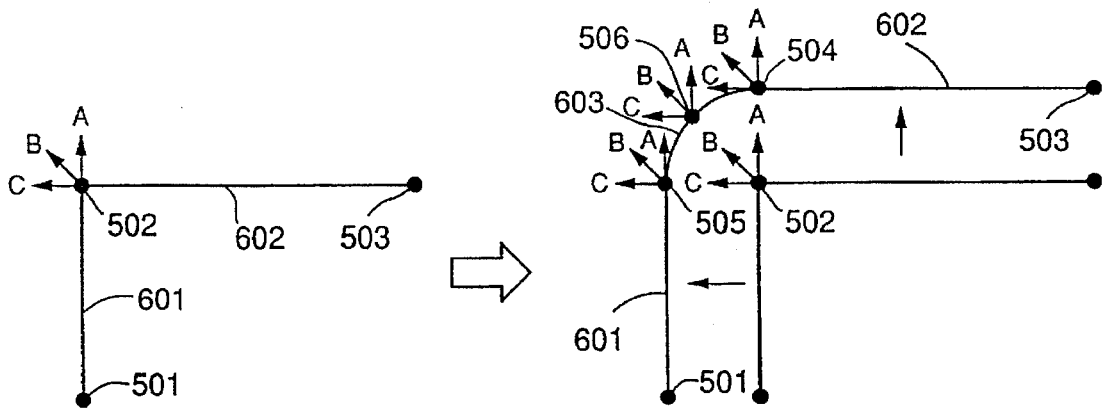
FIG. 5 is a schematic for explanation of an embodiment of the present invention.
Figure 6:
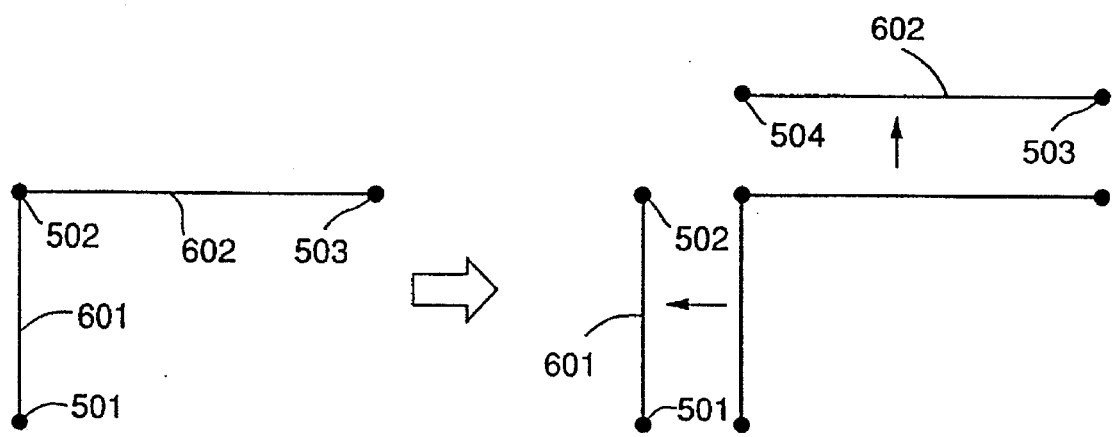
FIG. 6 is a schematic for explanation of an example of conventional technologies.

FIG. 5 shows an example of pattern data and pattern processing to which the present invention is applied. On the left side of the figure, there is data defining two lines 601 and 602 which are connected to each other at right angles at the point 502. Vectors A, B, and C are given to the coordinate data of the intersection point 502 as differential geometry characteristic information. Tangential vectors TV and normal vectors NV are also given to each of the line 601 and 602 as differential geometric characteristic information. If the enlargement processing is carried out for these pattern data in the directions designated by the arrows shown on the right side of the figure, points 501:(X1, Y1, Z1) and 503:(X3, Y3, Z3) are moved to points 501:(X1', Y1', Z1') and 503:(X3', Y3', Z3') respectively, and point 502:(X2, Y2, Z2) is divided into three points and moved to these points 504, 506, and 505 which are defined as points shifted from the point 502 by the amounts designated by the vectors A, B, and C or multiples thereof. A curve 603 is defined so that points 504, 506, and 505 are connected smoothly to each other. Furthermore, the vector B which represents the curvature at the point 506 is given to the curve 603 as a differential geometric characteristic information. In addition to coordinates, vectors A, B, and C which are characteristic information of the point 502 are given to the points 504, 506, and 505 which are produced as offspring of the point 502 by the enlargement. After enlargement and movement, the lines 601 and 602 still keep the tangential vectors TV and normal vectors NV given as characteristic information. The amount of the movement of the point 501 corresponds to the multiple of the vector C, and the amount of the movement of the point 503 corresponds to the multiple of the vector A. The data of the point 502 described on the right side of FIG. 5 is stored not as data after enlargement but as data showing the enlargement process.

As described above, characteristic information which indicates the intention of a user who creates the pattern is given to the data of point 502 as a vector which indicates the direction of the enlargement. As a result, when a pattern is enlarged, a curve 603 is automatically defined based on the characteristic information of the intersection point 502 so that the curve 603 bridges the lines 601 and 602, and the lines 601 and 602 are not separated from each other.

In the example above, a pattern is enlarged, but a curve can be defined and displayed by prescribing positions for two points and a curve at the middle point between these two points as done for the points 504, 505, and 506 in FIG. 5, for use in CAD, CAM, CAE, and CG systems where information of curves is dealt with. Furthermore, in the example above, differential geometric characteristic information such as tangential vectors of lines TV, normal vectors NV, curvature of curves, vectors indicating the directions concerning points, are used as characteristic information, but it is also possible to give optical characteristic amounts such as degree of reflection or absorption of light at surfaces, or geographical characteristic amounts which can be measured from a pattern of patterns, to pattern data to perform the pattern processing, keeping these characteristic amounts even after the processing is completed so that definition of patterns can be performed as an operator desires, or change of the expression form of patterns can be achieved thereby keeping the intention of an operator.

Figure 7:
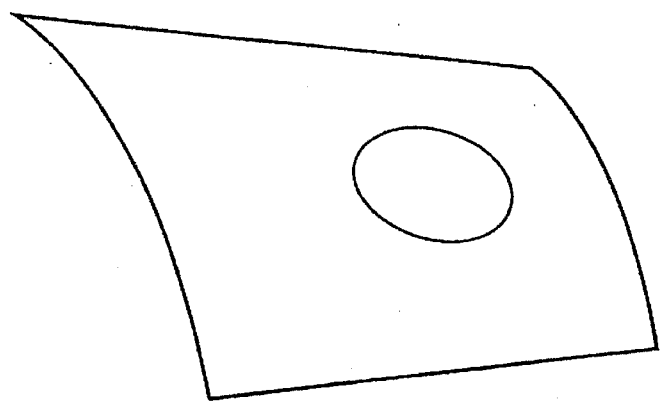
FIGS. 7, 8, and 9 are perspective views showing an embodiment of the present invention applied to the generation of a curved surface.

The next description shows another embodiment where a curved surface having a round shape aperture is created. When such data of curved surface is created by conventional technologies, it is required to perform the following two step processing. That is, first, the inside data is determined by interpolation from the boundary line of a plane to simply create a plane data, then, a round shape aperture is formed on the curved surface. In other words, first, a plane is extended inside the boundary line prescribing the periphery of the curved surface, then a hole is made in the extended plane. On the other hand, in the present invention, a circle is defined in the region inside the plane (inside the boundary line which describes the periphery of the curved surface) as shown in FIG. 7, and a curved surface (having round shape aperture) that the user desires can be easily created using the geometric characteristics of the circle such as plane characteristics, tangential vectors, and a constant curvature, etc. More specifically, a method of creating a surface (here, a curved surface having a round shape aperture) which is restricted by the geometric characteristics of a circle is next described.

Figure 8:
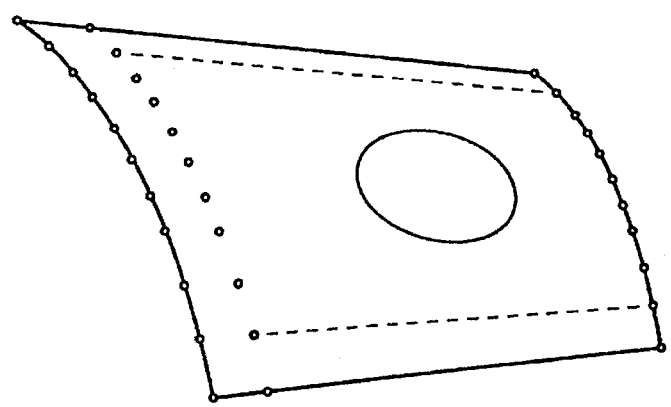
Figure 9:
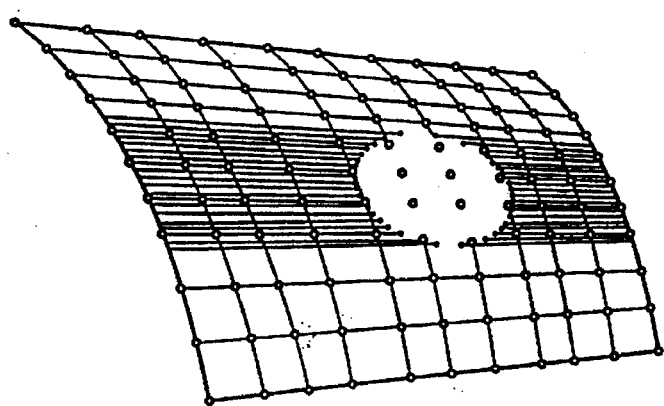

First, mesh points are generated across a surface inside the boundary line in a usual way. The number of the mesh points is determined by the user. In this embodiment, 10×10 mesh points (100 points in total) are used. Then, the number of points on a circumference which divide a circumference into parts is determined. In this embodiment, the circumference is divided into 36 parts by 36 points. And these dividing points of the circle are placed so that they overlap the corresponding mesh points on the surface (on the round shape aperture) as shown in FIG. 8. When there are no mesh points which fit points on the circumference, the number of mesh points is increased so that points on both the surface and the circumference coincide with each other. Then, B-spline surface is generated so that it contains each dividing point of the circumference as shown in FIG. 9. The points on the circumference have characteristic information such as plane characteristics, a constant tangential vector, and a constant curvature. Thus the generated curved surface has a round shape aperture which is described by the characteristic information set forth above.

As described above, the present invention provides a method wherein the user's intentions or characteristics of pattern elements or sets of pattern elements are described and added to the pattern data so that this characteristic information can be referred to when pattern processing is carried out, thus it is possible to easily make accurate representations of pattern data in a computer, and generate or convert patterns as the user desires.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A pattern data processing device, comprising:
 an information input/output device for inputting/outputting pattern data of pattern elements included in a pattern;
 a data storage device for storing said pattern data input by said information input/output device; and
 an information processing device including pattern processing means for processing said pattern, based on said pattern data stored in said data storage device;

wherein said pattern data includes a set of coordinate data of a plurality of points which describe said pattern elements and characteristic information for defining special pattern features of said pattern elements of at least one of said points within said coordinate data; and said pattern processing means processing said pattern by using said characteristic information as a restricting condition.

2. The pattern data processing device of claim 1, wherein said characteristic information includes differential geometry information of said pattern elements in accordance with said points.

3. The pattern data processing device of claim 1, wherein said pattern data includes line part data having set of coordinate data that describe the line part of said pattern elements and differential geometry information for defining special pattern features of said line part.

4. A pattern data processing device, comprising:

an information input/output device for inputting/outputting pattern data of pattern elements which make up a pattern;

a data storage device for storing said pattern data input by said information input/output device; and an information processing device for processing said pattern, based on said pattern data stored in said data storage device;

wherein said pattern data includes a set of coordinate data of a plurality of points that describe said pattern elements and characteristic information for defining special pattern features of said pattern elements of at least one of said points within said coordinate data;

wherein said information processing device comprises:

characteristic information input means for inputting said characteristic information in connection with said coordinate data of points, characteristic information describing means for storing said characteristic information, in connection with said coordinate data of points, that is input from said characteristic information input means into said data storage device, and pattern processing means for processing said pattern, based on said pattern data stored in said data storage device and processing said pattern by using said characteristic information as a restrictive condition.

5. The pattern data processing device of claim 4, wherein said characteristic information includes differential geometry information of said pattern elements in accordance with said points.

6. The pattern data processing device of claim 5, wherein said differential geometry information includes vector information such as a tangential vector or a normal vector.

7. The pattern data processing device of claim 4, wherein said pattern data includes line part data having a set of coordinate data which describes the line part of said pattern elements and differential geometry information for defining special pattern features of said line part;

said characteristic information input means inputs said characteristic information in connection with said line part data; and said characteristic information describing means further stores said characteristic information, in connection with said line part data, input from said characteristic information input means into said data storage device.

8. The pattern data processing device of claim 7, wherein said information input/output device comprises a display screen for displaying said pattern, and said characteristic information input means displays a command for requesting input of said characteristic information on said display screen.

9. A pattern data processing device, comprising:

an information input/output device for inputting/outputting pattern data of pattern elements which make up a pattern;

a data storage device for storing said pattern data input by said information input/output device; and an information processing device for processing said pattern, based on said pattern data stored in said data storage device;

wherein said pattern data includes a set of coordinate data of a plurality of points that describe said pattern elements and characteristic information for defining special pattern features of said pattern elements of at least one of said points within said coordinate data;

wherein said information processing device comprises:

characteristic information extraction means for extracting at least one of said characteristic information, based upon pattern data stored in said data storage device, characteristic information describing means for storing said characteristic information, in connection with said coordinate data of said points, extracted from said characteristic information extraction means into said storage device, and pattern processing means for processing said pattern, based on said pattern data stored in said data storage device, and processing said pattern by using said characteristic information as a restrictive condition.

10. The pattern data processing device of claim 9, wherein said characteristic information includes differential geometry information of said pattern elements in accordance with said points.

11. The pattern data processing device of claim 10, wherein said differential geometry information includes vector information such as a tangential vector or a normal vector.

12. The pattern data processing device of claim 9, wherein said pattern data includes line part data having a set of coordinate data that describe the line part of said pattern elements and differential geometry information for defining special pattern features of said line part;

said characteristic information extraction means extracts said characteristic information in connection with said line part data; and said characteristic information describing means further stores said characteristic information, in connection with said line part data, extracted from said characteristic information extraction means into said data storage device.

13. The pattern data processing device of claim 12, wherein said information input/output device comprises a display screen for displaying said pattern, and said characteristic information input means displays a command for requesting input of said characteristic information on said display screen.

14. A pattern data processing device, comprising:

an information input/output device for inputting/outputting pattern of pattern elements which make up a pattern;

a data storage device for storing said pattern data input by said information input/output device; and an information processing device for processing said pattern, based on said pattern data stored in said data storage device;

wherein said pattern data includes a set of coordinate data of a plurality of points which describe said pattern elements and characteristic information for defining special pattern features of said pattern elements of at least one of said points within said coordinate data;

wherein said information processing device comprises:

characteristic information input means for inputting said characteristic information in connection with said coordinate data of points, characteristic information extraction means for extracting at least one of said characteristic information, based upon pattern data stored in said data storage device, characteristic information describing means for storing, in connection with said coordinate data of said points, said characteristic information input from said characteristic information input means and said characteristic information extracted from said characteristic information extraction means into said data storage device, and pattern processing means for processing said pattern, based on said pattern data stored in said data storage device, and processing said pattern by using said characteristic information as a restrictive condition.

15. The pattern data processing device of claim 14, wherein said characteristic information includes differential geometry information of said pattern elements in accordance with said points.

16. The pattern data processing device of claim 15, wherein said differential geometry information includes vector information such as a tangential vector or a normal vector.

17. The pattern data processing device of claim 14, wherein:

said pattern data includes line part data having a set of coordinate data that describes the line part of said pattern elements and differential geometry information for defining special pattern features of said line part;

said characteristic information input means inputs said characteristic information in connection with said line part data;

said characteristic information extraction means extracts said characteristic information in connection with said line part data; and said characteristic information describing means further stores, in connection with said line part data, said characteristic information to be input from said characteristic information input means and said characteristic information extracted from said characteristic information extraction means into said data storage device.

18. The pattern data processing device of claim 17, wherein said information input/output device comprises a display screen for displaying said pattern; and said characteristic information input means displays a command for requesting input of said characteristic information on said display screen.

19. A pattern data processing method for processing a pattern based on pattern data of pattern elements that constitute said pattern, wherein characteristic information for defining special pattern features of said pattern elements of at least one of a plurality of points of coordinate data that describe said pattern elements is added to said coordinate data, and said processing of said pattern is conducted by using said characteristic information as a restrictive condition.

20. The pattern data processing method of claim 19, wherein differential geometry information for defining special pattern features of a line part of said pattern elements is added to line data assembled from coordinate data for describing the line parts of said pattern elements, and said processing of said pattern is conducted by using said characteristic information as a restrictive condition.

* * * * *